United States Patent Office 3,516,786
Patented June 23, 1970

3,516,786
METHOD OF PREPARING MICROCRYSTALLINE
FAUJASITE-TYPE ZEOLITE
Philip K. Maher and Julius Scherzer, Baltimore, Md., assignors to W. R. Grace & Co., New York, N.Y., a corporation of Connecticut
No Drawing. Filed Feb. 23, 1968, Ser. No. 707,460
Int. Cl. C01b 33/28
U.S. Cl. 23—113    4 Claims

ABSTRACT OF THE DISCLOSURE

This invention relates to the preparation of a novel small particle size molecular sieve zeolite using a novel water-miscible organic solvent crystallization medium. The disclosed microcrystalline molecular sieve has a particle size in the range of from 10 to 100 millimicrons and a surface area of at least 500 m.²/g.

---

Broadly, our invention relates to a fine size molecular sieve product which is distinguished from prior art small particle size molecular sieves in that it has an extremely high surface area. More specifically, we have discovered that by carefully controlling the ratio of reactants within particular set ranges and then by adding a small quantity of an organic solvent to the reaction mixture immediately prior to the aging step, we are able to produce a small particle size product having an increased surface area as compared to the small particle size products of the prior art.

In our particular invention we have our primary concern with the production of the specific type crystalline molecular sieve zeolite having a faujasite-type structure. These type zeolites are commonly referred to as Type X and Type Y by the Linde Division of the Union Carbide Corporation or as Z-12, Z-14, Z-14US by the Davison Division of W. R. Grace & Co. Although we are primarily concerned with the production of faujasite-type structure zeolites, we believe that our invention could be also applied to the production of other type zeolites by carefully controlling the ratios of reactants within their limits produces other type zeolites.

The aluminosilicate zeolites, and particularly the faujasite-type zeolites, are of particular interest because of their selective adsorption properties and extremely high catalytic activity to promote certain acid-type catalyzed reactions, particularly hydrocarbon cracking. Because of their extremely high activity, zeolite materials are seldom used as catalysts in the pure form, but rather are usually used dispersed throughout a matrix material of considerably less activity such as, for example, silica gel, alumina or silica-alumina. One problem which arises in the matrix form of the catalyst is that because of the large particle size of the zeolites of the prior art, the extreme catalytic activity of the catalyst will be necessarily located and concentrated within a relatively few number of centers throughout the catalyst matrix. By using a zeolite which has a very small particle size, we are able to obtain very good distribution of the zeolite throughout the matrix and, thus, enhance catalytic contact with the reactants and the desorption of the reaction products form the active zeolite particles. Where it is desired to use the zeolite in its pure form, that is, without a matrix, very small particle sizes facilitate intimate distribution and dispersion throughout the reaction material and similarly facilitate the rapid stripping of the reaction products or adsorbed material. The zeolite products of our process further enhance these effects because they have an increased surface area and an improved crystallinity as compared with small particle size zeolites produced by other processes.

Chemically, the faujasite zeolites may be represented by the general formula:

$$M_{2/n}O : Al_2O_3 : 2\text{-}7 SiO_2 : yH_2O$$

where M is a cation and $n$ is its valence and $y$ is a function of the degree of dehydration and ranges between 0 to 8.

The structure of a number of the zeolites has been shown to be based on units consisting of tetrahedra, of silica and alumina which, in turn, are connected to form a cubo-octahedral unit similar to that found in natural sodalite. A variation in stacking or combination of these octahedral units will lead to a variety of zeolites. Thus, the faujasite structure consists of a diamond-type lattice of the cubo-octahedral units joined by pairs of six membered rings. This is a well-ordered structure having all the aluminum atoms tetrahedrally coordinated with oxygen and having one excess negative charge for each aluminum atom in the lattice. This charge is electrically balanced by the presence of a cation that has a great degree of mobility and which may be exchanged with other cations in various embodiments. The general production of synthetic crystalline faujasites having particle sizes on the order of 1 to 3 microns is old to the art and examples of such methods may be found in the following U.S. Pat. Nos.: 2,882,243 (Type A); 2,882,244 (Type X); and 3,130,007 (Type Y).

In summary, our invention comprises mixing cold dilute aqueous solutions of a silicate and of an aluminate in the presence of a water-miscible organic solvent and then aging the resulting slurry and upon completion of aging, reacting the aged slurry at temperatures in the order of 100° C. Alternatively, in effecting our invention, the reaction solvent may be added to the slurry after the aging step, but prior to the higher temperature reaction step. The crystalline zeolite product of our invention is characterized by a particle size of from 10 to 100 millimicrons and a surface area in excess of 500 m.²/g. and up to 900 m.²/g.

Now describing a preferred embodiment of our invention, we first prepare an alkaline metal silicate solution having a silicate concentration of from 10 to 20 weight percent by dissolving an appropriate amount of commercially available alkaline metal silicate solution in the appropriate amount of water to give the desired concentration. The resulting solution is normally clear; however, in some instances, it may be desirable to add a small quantity of sodium hydroxide to further ensure the clarity of the solution. Although any alkaline metal silicate may be used, we will frequently refer to the use of sodium silicate for convenience in the following description.

We next prepare an aluminate solution having an aluminate concentration of from 5 to 15 weight percent, by dissolving the appropriate amount of an alkaline metal aluminate in a sodium hydroxide solution having a sodium concentration of from 20 to 30 weight percent. Sufficient sodium hydroxide must be used so that the entire quantity of alkaline metal aluminate will be dissolved resulting in a substantially clear solution. Also, again, as with the silicate solution, the alkaline metal aluminate solution will normally be a sodium aluminate and the remainder of the description will be described in terms of this although other alkaline metal aluminates could be used.

Both the aluminate solution and the silicate solution are then cooled to a temperature in the range of from 0 to 10° C. and preferably about 4° C. The cooled aluminate and silicate solutions are then mixed together in appropriate quantities to provide a reaction solution having the following mole ratios:

$SiO_2/Al_2O_3$—between 4 and 20, preferably about 6;
$Na_2O/Al_2O_3$—between 6 and 15, preferably about 10;
$H_2O/Al_2O_3$—between 200 and 500, preferably about 300.

Initially, upon mixing, a clear solution results; however, after a few minutes an aluminosilicate gel begins to form. The aluminosilicate sol or solution gel is then aged for from 6 to 24 hours at a temperature of from 20 to 50°C., with slight stirring. After aging, the aluminosilicate is crystallized by raising the temperature of the aged mass to from 80 to 100° C. and maintaining this temperature for 2 to 16 hours. After the crystallization step, the crystalline aluminosilicate zeolite is then filtered and dried by conventional methods.

The above process results in a small particle size crystalline aluminosilicate zeolite having a faujasite structure. The critical feature of our invention is the modification of this process by the addition of an organic solvent which is miscible in water to either of the reaction solutions — i.e., either the silicate solution or the aluminate solution, prior to the mixing of the reaction solution—or by the addition of the organic solvent to the reaction solution during the 20 to 50° C. aging step but prior to the crystallization step. It is not critical to which solution the organic solvent is added so long as it is added prior to the crystallization step—so that it is present during the entire crystallization step. The quantity of organic solvent added is by volume equal to about 0.1 to 20 percent of the volume of the aqueous aluminosilicate gel slurry. As before-mentioned, the particular organic solvent must be miscible in water. We have found the following organic solvents to be particularly useful: methanol, ethanol, dimethylsulfoxide, dimethylformamide, tetrahydrofurane, dioctane, and acetone. Although, of course, other organic miscible solvents of the same nature may be used.

The product produced by our inventive process has an improved degree of crystallinity and an increased surface area over the product produced without using our inventive step of adding the organic solvent. More particularly, the product of our inventive process is a faujasite-type crystalline aluminosilicate zeolite having a particle size of from 10 to 100 millimicrons and a surface area of at least 500 m.²/g. The X-ray defraction pattern of our product is characterized by similarity to the faujasite pattern with a slight broadening of diffusion of the defraction peaks.

In a further embodiment of our invention, the product of our invention may be ion exchanged with a cation salt solution to remove or reduce the sodium ion contents of the product. This is particularly advantageous where the product is to be used as a hydrocarbon cracking, etc. catalyst since the sodium ion is somewhat deleterious to the cracking reaction and further limits the stability of the zeolite. Suitable ion exchange cations which may be used are cations of the metal Group I(b) through Group VIII of the Periodic Table, and also hydrogen cations or cations such as ammonium ion, which will decompose into the hydrogen ion from upon the application of heat. It is also particularly advantageous that the cation be a cation of the rare earth metals.

Our invention is further ilustrated by the folowing explanatory but non-limiting examples:

EXAMPLE I

This example illustrates the preparation, according to our invention, of a faujasite microcrystalline Type X molecular sieve.

In this example, a sodium silicate solution was prepared by first dissolving 90 grams of sodium hydroxide in 392 ml. of water and then cooling the resulting solution to room temperature. 393.8 grams of sodium silicate solution containing 28.5 percent by weight $SiO_2$ and 8.7 percent by weight $Na_2O$ was added to the hydroxide solution with stirring. The resulting clear sodium silicate solution was then mixed with 300 grams of crushed ice which brought the temperature of the solution to below 4° C. A sodium aluminate solution was then prepared by first preparing a sodium hydroxide solution by dissolving 90 grams of sodium hydroxide in 319 ml. of water and then adding 68 grams of sodium aluminate (having a mole ratio composition of $1Na_2O:1Al_2O_3:3H_2O$) to the hydroxide solution and then heating the solution until the solution became clear. The clear solution was then cooled to room temperature and then 300 grams of crushed ice was added to bring the temperature below 4° C. The sodium aluminate solution was then blended slowly with the sodium silicate solution with stirring. The aluminosilicate gel started to precipitate from the clear solution mixture after about 5 minutes. The resulting slurry had a mole ratio composition of $10Na_2O:1Al_2O_3; 6SiO_2s300H_2O$. Methanol was then added to the slurry in a quantity amounting to 3 percent of the total volume of the resulting mixture. The mixture was then aged with moderate stirring for 16 hours at room temperature (about 20° C.) and then heated at boiling temperature (about 100° C.) with refluxing for 4 hours. The resulting crystalline faujasite zeolite was then filtered and washed several times with deionized water and dried at 100° C.

The physical characteristics of the product are summarized in the following table:

TABLE I

X-ray defraction pattern; faujasite-type pattern with weak, broad peaks;
Particle size determined by electronic microscope: 30 to 80 millimicrons
Surface area determined by standard Banner-Emmett-Teller methods after being heated at a temperature of 800° F. for 2 hours 618 m.²/g.

The molar chemical composition of the crystalline zeolite was as follows:

$$Na_2O:Al_2O_3:2.5SiO_2:XH_2O$$

EXAMPLE II

This example illustrates a method of preparing small particle size crystalline faujasite-type molecular sieve zolites in which an organic solvent is not used.

In this example, the exactly same procedure was followed as that followed in Example I with the exception that methanol was not added.

The physical characteristics of the resulting product was approximately the same as that of the above example with the notable exception that the surface are of the product determined in the same method as Example I is only 463 m.²/g.

EXAMPLE III

This example illustrates a method according to our invention of preparing small particle size faujasite microcrystalline zeolite (Type X), in which dimethylsulfoxide is used as the organic solvent and in which the organic solvent is added after the aging step but prior to the crystallization step. This example further illustrates the embodiment in which a portion of the sodium cation is removed by ion exchange.

In this example a aluminosilicate reaction slurry having the following mole ratio content:

$$10Na_2O:Al_2O_3:6SiO_2:300H_2O$$

was prepared in the same manner as in Example I. The aluminosilicate reaction slurry was then allowed to age at room temperature (about 20° C.) with stirring for 18 hours. After which time, a quantity of dimethylsulfoxide was added in amount approximately equal to 1% of the total volume. The mixture was then heated at boiling (about 100° C.) for 6 hours with reflux to crystallize the aluminosilicate. The resulting product was then filtered and washed 4 times with deionized water and then vacuum-dried.

This crystalline zeolite product was then ion exchanged with a rare earth solution to remove a portion of the sodium cation. The ion exchange was effected by contacting the wet filter cake with a rare earth chloride solution using a weight ratio of wet cake to rare earth chloride to water of 2:1:10. The zeolite cake was allowed to steep in the rare earth chloride exchange solution for 30 minutes at boiling temperature with stirring. The solution was then filtered and the exchange step repeated but using a ratio of wet cake to rare earth chloride to water of 1:1:20. The resulting exchange material was then filtered and washed free of chloride ions. The wet silicate was then dried in a draft oven at 400° F. The dried cake was then broken up and then activated by heating for 3 hours at 1000° F.

A chemical analysis and determination of the physical properties of the finished product was then made. The chemical analysis and physical properties of this product are summarized below.

Chemical analysis 2.2% total volatiles at 1750° F.,
1% $Na_2O$,
24.6% $Al_2O_3$,
32.96% $SiO_2$,
26.85% rare earth oxide Physical characteristics X-ray defraction pattern: faujasite-type pattern with weak, broad peaks;
Particle size determined by X-ray defraction: approximately 160 angstroms
Banner-Emmett-Teller surface area: 564 m.²/g. (after activation at 1000° F. for 3 hours).

Obviously, many modifications and variations of our invention may be made without departing from the scope and essence thereof and only such limitations which are specifically set forth in the appended claims should be applied.

We claim:

1. A method of making a microcrystalline faujasite-type aluminosilicate zeolite having a particle size of from 10 to 100 millimicrons, which comprises:
   (a) providing an alkali metal silicate solution having a silicate concentration of from 10 to 20 weight percent and a temperature of from 0 to 10° C.;
   (b) providing an alkali metal aluminate solution having an aluminate concentration of from 5 to 15 weight percent and a temperature of from 0 to 10° C.;
   (c) mixing appropriate quantities of the silicate solution and the aluminate solutions together to provide a reaction solution mixture having a mole ratio content within the following mole ratios:
      $SiO_2/Al_2O_3$ from 4 to 20
      Alkali metal oxide/$Al_2O_3$ from 6 to 15
      $H_2O/Al_2O_3$ from 200 to 500,
   whereby an aluminosilicate gel slurry is formed;
   (d) aging the aluminosilicate gel slurry at a temperature of from 20 to 50° C. for from 6 to 24 hours;
   (e) crystallizing the aged slurry at a temperature of from 80 to 110° C. for 2 to 16 hours whereby the small particle size faujasite crystalline zeolite is formed; and
   (f) recovering the formed faujasite, and the improvement which comprises adding a quantity of a water-miscible organic solvent sufficient to provide 0.1 to 20% by volume of the reaction solution mixture including said organic solvent in any step prior to the crystallization step (step e), whereby a small particle size faujasite-type alumino-silicate zeolite having an improved crystallinity and an increased surface area is produced.

2. The process of claim 1 wherein the reaction solution mixture has the following mole ratio contents:
   $SiO_2/Al_2O_3$ of about 6
   Alkali metal oxide/$Al_2O_3$ of about 10
   $H_2O/Al_2O_3$ of about 300.

3. The process of claim 1 wherein the water-miscible organic solvent is methanol.

4. The process of claim 1 wherein the solvent is dimethylsulfoxide.

References Cited

UNITED STATES PATENTS

| | | | |
|---|---|---|---|
| 2,882,244 | 4/1959 | Milton | 23—113 |
| 2,979,381 | 4/1961 | Gottstine | 23—113 |
| 3,130,007 | 4/1964 | Breck | 23—113 |
| 3,185,544 | 5/1965 | Maher | 23—112 |
| 3,313,594 | 4/1967 | Wilson | 23—113 |
| 3,321,272 | 5/1967 | Kerr | 23—113 |

EDWARD J. MEROS, Primary Examiner